S. S. SPIRE.
FRONT CASTER WHEEL FOR PLOWS.
APPLICATION FILED SEPT. 29, 1910.
1,065,840.
Patented June 24, 1913.
2 SHEETS—SHEET 1.
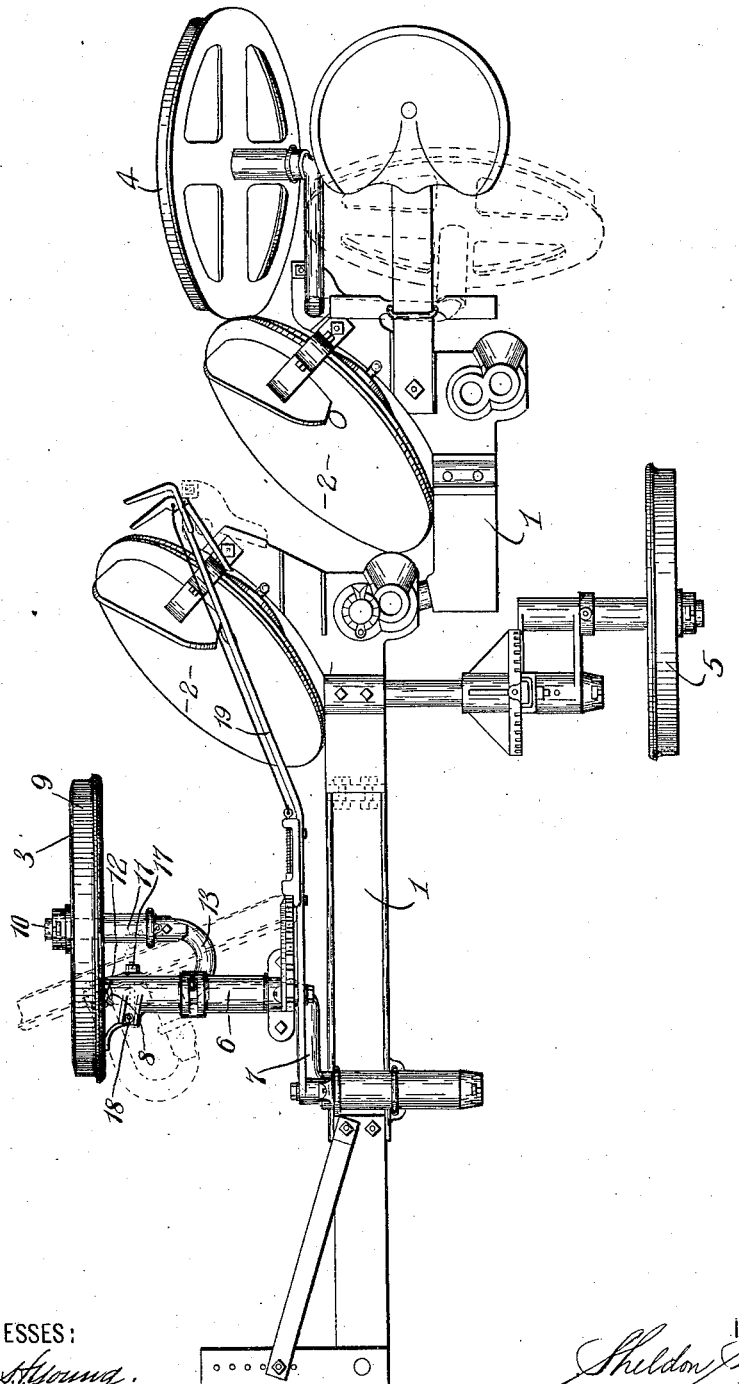
WITNESSES:
INVENTOR
BY
ATTORNEYS

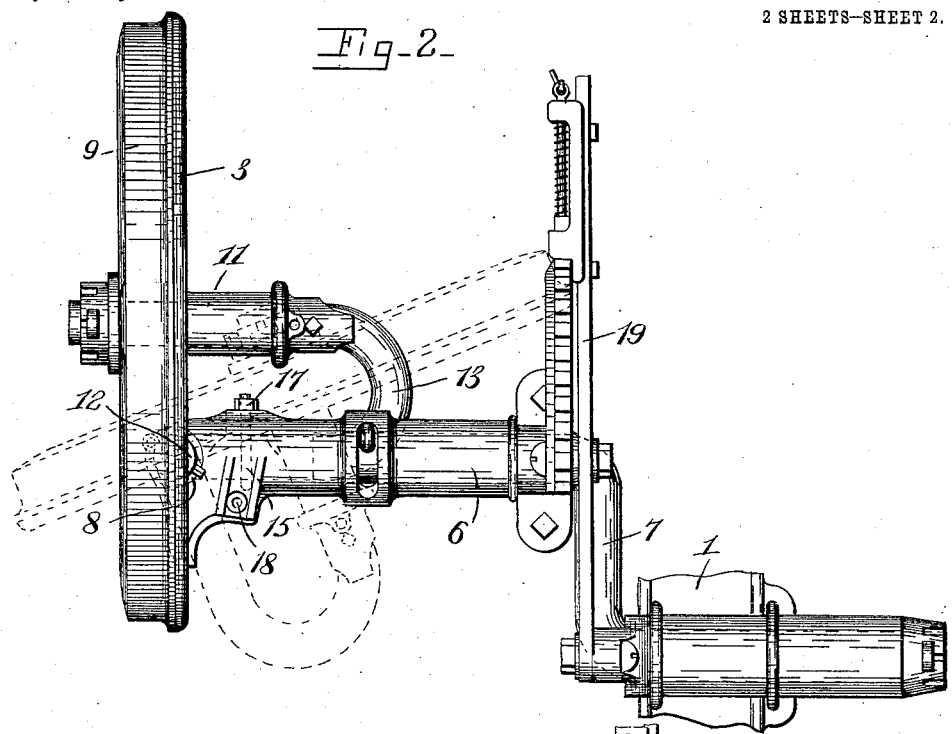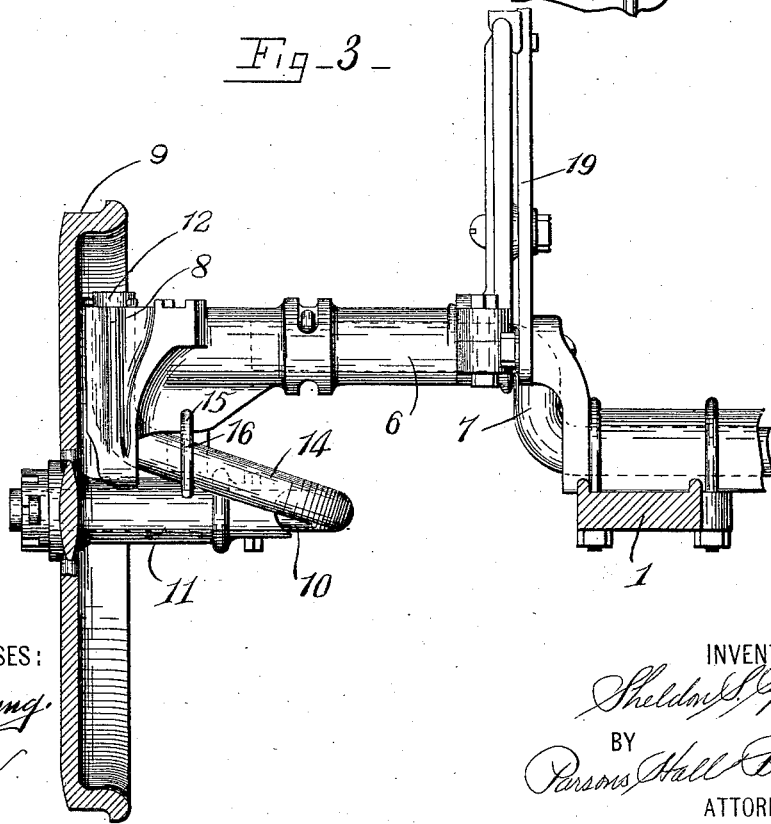

UNITED STATES PATENT OFFICE.

SHELDON S. SPIRE, OF SYRACUSE, NEW YORK, ASSIGNOR TO SYRACUSE CHILLED PLOW COMPANY, OF SYRACUSE, NEW YORK, A CORPORATION OF NEW YORK.

FRONT CASTER-WHEEL FOR PLOWS.

1,065,840.   Specification of Letters Patent.   Patented June 24, 1913.

Application filed September 29, 1910. Serial No. 584,399.

*To all whom it may concern:*

Be it known that I, SHELDON S. SPIRE, of Syracuse, in the county of Onondaga and State of New York, have invented a certain new and useful Front Caster-Wheel for Plows, of which the following is a specification.

My invention relates to plows and has for its object a particularly simple and efficient means for controlling the castering of the front furrow wheel, and it consists in the combinations and constructions hereinafter set forth and claimed.

In describing this invention, reference is had to the accompanying drawing in which like characters designate corresponding parts in all the views.

Figure 1 is a plan of one form of a plow, embodying my invention. Fig. 2 is a plan of the front furrow wheel and contiguous parts. Fig. 3 is a front elevation partly in section, of the parts seen in Fig. 2.

As illustrated this invention is embodied in a disk plow, but it is obvious that it may be embodied in any form of a plow.

1 is the main frame which carries the earth-turning elements or disks 2, said frame being supported in any suitable manner by front and rear furrow wheels 3 and 4 and a land wheel 5.

6 is a frame connected to the main frame by a crank member 7 and formed with a substantially upright bearing 8 at its outer end.

The front furrow wheel 3 is arranged upright and not staggered, and is formed with an inwardly extending annular flange 9 at its outer edge, the periphery of which flange forms the greater part of the tread of the wheel. The upright bearing 8 of the frame 6 is arranged within the flange 9 of the furrow wheel 3, and hence the axis of said bearing extends through the flange of the furrow wheel above and below the bearing, and the shortest distance between the axes of the bearing 8 and wheel 3 is less than the radius of said wheel. The furrow wheel 3 is held by a member having a substantially horizontal axle 10 extending into the hub 11 of the furrow wheel 3, a spindle 12 journaled in the upright bearing 8, and a part 13 connecting the spindle and the axle, said part having a portion 14 extending laterally from the spindle and arranged in a vertical plane parallel to the vertical plane of the axle 10. Thus, as best seen in Fig. 2, the plan of the holding member is substantially U-shaped in general outline.

The furrow wheel 3 may be held from castering, as when the plow is being used on a side hill, by a stop 15 extending through a horizontal and transverse passage in the frame 6, said stop 15 having a downturned end portion 16 which extends into the path of the portion 14 of the holding member and thereby holds the furrow wheel from castering into the position indicated in dotted lines, Figs. 1 and 2. Said stop 15 is detachably secured to the frame 6, and is here shown as provided with a nut 17 at its rear end. The frame 6 is also provided with a suitable opening 18 by means of which a scraper, not shown, for the wheel 3 may be attached to the frame 6.

The front furrow wheel shown and described herein is arranged in an upright position, and casters as easily as a staggered wheel, owing to the arrangement of the spindle 12 near the axle 10 and in the vertical plane of the tread of the wheel 3.

The main frame may be raised or lowered relatively to the frame by a lever 19 and coacting mechanism. As said lever and coacting mechanism form no part of this invention, and as their construction and operation is well known, further description thereof is thought to be unnecessary.

What I claim is:—

1. In a plow, a frame formed with a substantially upright bearing, a front caster wheel having a flange on the inner side thereof, the periphery of the flange forming a part of the thread of the wheel, the bearing of the frame being located within said flange, and a member for holding the caster wheel, said member having a substantially upright spindle journaled in the bearing, the axis of the spindle passing through the tread of the wheel above and below the spindle, a substantially horizontal axle for the caster wheel, and a part connecting the spindle and the axle, substantially as and for the purpose set forth.

2. In a plow, a frame formed with a substantially upright bearing, a front caster wheel having a flange on the inner side thereof, the periphery of the flange forming a part of the tread of the wheel, the bearing of the frame being located within said flange, and a member for holding the caster wheel, said member having a substantially upright spindle journaled in the bearing, the axis of the spindle passing through the tread of the wheel above and below the spindle, a substantially horizontal axle for the caster wheel, and a part connecting the spindle and the axle, said part having a portion thereof extending laterally from the spindle and located in a vertical plane parallel to the vertical plane of the axle, substantially as and for the purpose specified.

In testimony whereof, I have hereunto signed my name in the presence of two attesting witnesses, at Syracuse, in the county of Onondaga, in the State of New York, this 21st day of Sept. 1910.

SHELDON S. SPIRE.

Witnesses:
CHAS. H. YOUNG,
A. J. SPIRE.

Copies of this patent may be obtained for five cents each, by addressing the "Commissioner of Patents, Washington, D. C."